United States Patent [19]

Bagdal et al.

[11] Patent Number: 5,092,392
[45] Date of Patent: Mar. 3, 1992

[54] PNEUMATIC GAP SENSOR AND METHOD

[75] Inventors: Karl T. Bagdal, Middletown; Edward L. King, Trenton; Donald W. Follstaedt, Middletown, all of Ohio

[73] Assignee: Armco, Inc., Middletown, Ohio

[21] Appl. No.: 759,735

[22] Filed: Sep. 12, 1991

Related U.S. Application Data

[63] Continuation of Ser. No. 542,315, Jun. 22, 1990.

[51] Int. Cl.$^5$ .............................................. B22D 11/18
[52] U.S. Cl. .................................... 164/453; 164/452; 164/155; 164/463
[58] Field of Search ................. 164/4.1, 451, 452, 453, 164/150, 154, 155, 423, 463, 479, 429

[56] References Cited

U.S. PATENT DOCUMENTS 5,000,250  3/1991  Feurstacke .......................... 164/155

FOREIGN PATENT DOCUMENTS

59-54456   3/1984  Japan ..................... 164/452
60-162554  8/1985  Japan ..................... 164/453

*Primary Examiner*—Kuang Y. Lin
*Attorney, Agent, or Firm*—Frost & Jacobs

[57] ABSTRACT

An apparatus and method for monitoring and maintaining a predetermined width in the gap between a casting nozzle and a casting wheel, wherein the gap is monitored by means of at least one pneumatic gap sensor. The pneumatic gap sensor is mounted on the casting nozzle in proximity to the casting surface and is connected by means of a tube to a regulator and a transducer. The regulator provides a flow of gas through a restictor to the pneumatic gap sensor, and the transducer translates the changes in the gas pressure caused by the proximity of the casting wheel to the pneumatic gap sensor outlet into a signal intelligible to a control device. The relative positions of the casting nozzle and casting wheel can thereby be selectively adjusted to continually maintain a predetermined distance between their adjacent surfaces. The apparatus and method enables accurate monitoring of the actual casting gap in a simple and reliable manner resistant to the extreme temperatures and otherwise hostile casting environment.

21 Claims, 5 Drawing Sheets

PNEUMATIC GAP SENSOR AND METHOD

The U.S. Government has a paid-up license in this invention and the right in limited circumstances to require the patent owner to license others on reasonable terms as provided for by the terms of contract No. DE-FC07-88ID12712 awarded by the U.S. Department of Energy.

This is a continuation of application Ser. No. 07/542,315, filed June 22, 1990, now abandoned.

TECHNICAL FIELD

This invention relates to pneumatic devices for monitoring the distance between two surfaces, and, more particularly, for monitoring and precisely controlling a gap between a casting nozzle and a casting wheel.

BACKGROUND ART

Generally, casting is the process by which molten material is formed into solid shapes. A known method for casting materials has involved the use of rolling cylinders to compress slabs of cast material to a desired thickness. However, this process is very energy intensive and costly.

An alternative casting method for producing a strip of material of a desired thickness, known as strip casting, incorporates a rotating wheel, drum, belt or other substrate. The rotating substrate is placed in close proximity to a casting nozzle from which molten material flows. The molten material is deposited on the rotating substrate where it cools, solidifies or "freezes", and is subsequently removed for further processing.

However, when the molten material is initially introduced through the casting nozzle and onto the casting wheel, heat is exchanged from the high temperature molten material to the lower temperature casting nozzle and casting wheel. This transfer of heat energy to the casting nozzle and the casting wheel causes them to expand, often in an unpredictable and non-uniform manner. As a result of this expansion, the distance between the adjacent surfaces of the casting wheel and the casting nozzle is often reduced.

Until the temperatures of the casting nozzle and the casting wheel reach a steady state, at which time further expansion of the casting nozzle and the casting wheel is minimized, the gap between them will not be a uniform or constant distance. In at least the case of planar flow casting, an example of which is illustrated in U.S. Pat. No. 4,771,820, the gap between the casting nozzle and the casting substrate can affect the thickness of the cast material, which is generally crucial to the quality of the cast material. If the cast material does not have the desired thickness, it may either be scrapped or mechanically reformed, both of which are expensive, time consuming, and inefficient.

The inability to control and maintain a desired distance or gap between the casting nozzle and the casting wheel can also cause a variety of other problems during casting. For example, if the distance between the casting nozzle and the casting wheel becomes too large, the molten material can flow along the face of the casting nozzle rather than onto the casting wheel. Material which is not deposited onto the casting wheel will inherently begin to cool as it flows along the nozzle, and can thereby interfere with the efficient operation of the machinery and compromise the quality and uniformity of the resultant cast product. Conversely, if a minimum gap between the casting nozzle and the casting wheel is not maintained, contact may occur between them which can result in severe damage to both the nozzle and the wheel. Such a situation obviously interferes with the safety and efficiency of the casting process.

In particular, when steel and other high temperature materials are strip cast, the relative expansions of the casting nozzle and casting wheel are virtually impossible to avoid. Since it is not generally economical to pre-heat a casting nozzle and a casting wheel to their steady state temperatures, a variety of methods have been used to measure and maintain the distance between a casting nozzle and a casting wheel. An example of an unique electronic device and method for monitoring and maintaining this distance involving the flow of electricity between the casting nozzle and the surface of the casting wheel is disclosed in the commonly owned U.S. Patent Application entitled ELECTRONIC GAP SENSOR AND METHOD, filed concurrently herewith in the names of Robert S Williams, Edward L. King, and Steven L. Campbell.

A known method of measuring the distance between a casting nozzle and a casting wheel using lasers is disclosed in U.S. Pat. No. 4,399,861, which issued to Carlson on Aug. 23, 1983. In the Carlson patent, a laser beam is transversely projected along the gap between a casting nozzle and a casting wheel. Photodiodes are provided to detect the presence of the laser beam on the other side of the gap, from which, as described in the Carlson patent, the gap can then be calculated.

However, the use of lasers has several drawbacks. In particular, laser methods and equipment are generally expensive and complicated to perform, especially for casts of wide strips of very hot alloys such as steel. In addition, lasers require a straight line of sight between the laser source and the laser detector, through which the laser beam may travel. Providing that unencumbered passageway is often impractical between the expanding casting nozzle and substrate. Moreover, the presence of smoke, heat, dust and other gases and particles produced during casting may interfere with and restrict the passage of a laser beam through the gap.

An example of a device using a pressure sensor to measure imperfections on a machined roll is disclosed in U.S. Pat. No. 4,524,546, which issued to Hoover et al., on June 25, 1985. The Hoover patent discloses a sensor which uses a pressurized fluid such as air to measure the distance between the sensor and a machined roll. The air is provided by a regulator to the sensor and is expelled through an outlet orifice in proximity with the roll. When the air leaves the outlet orifice, it encounters a resistance from the adjacent surface of the roll, restricting the flow of air out of the sensor. This resistance results in an increased pressure in the sensor which can be detected by a pressure transducer. Differences in pressure signify different distances between the sensor and the roll. The recording of these differences on a chart recorder allows for the measurement of the crown and taper in a roll without removing the roll from the grinding station.

However, the pressure sensor disclosed in the Hoover patent is not used as a means for determining the gap between a casting nozzle and a moving substrate. Furthermore, the device disclosed in the Hoover patent is not designed to function in the high temperatures and hostile environment associated with casting. Moreover, the Hoover sensor is not used as a means for selectively adjusting the relative positions of a casting nozzle and a casting substrate.

Consequently, heretofore, there has not been available a suitable low cost and reliable means for measuring and maintaining a predetermined gap between a casting nozzle and a casting wheel which does not physically contact the casting wheel. Furthermore, there has not been available a dependable sensing device for pneumatically measuring the gap within the unique and hostile environment between a casting nozzle and a casting wheel. Additionally, there is a need in the industry, which heretofore has not been fulfilled, for accurately, reliably, and relatively inexpensively regulating the position of a casting nozzle with respect to a casting wheel along one or more axes.

DISCLOSURE OF THE INVENTION

Accordingly, it is an object of the present invention to provide a device for measuring the distance between a casting nozzle and a casting wheel which does not physically contact the casting wheel.

It is another object of the present invention to provide a device for determining the distance between a casting nozzle and a casting wheel which will reliably operate in the hostile environment and extreme temperatures associated with casting.

It is yet another object of the present invention to provide a pneumatic gap sensor for determining the relative positions of or distance between a casting nozzle and a casting wheel, and means for dynamically controlling the relative distance between the casting nozzle and the casting wheel in response to the determined gap distance.

It is also an object of the present invention to provide a method for making real time or dynamic adjustments to the relative distance between a casting nozzle and a casting wheel through the use of one or more pneumatic gap sensors.

In accordance with one aspect of the present invention, there is provided a device and method for monitoring and regulating the gap between a casting nozzle and a casting wheel. The gap between the casting nozzle and the casting wheel is determined by means of one or more pneumatic gap sensors mounted adjacent the casting nozzle. The pneumatic gap sensor is connected by means of a tube to a regulator and a transducer. The regulator provides a flow of gas through a restrictor to the pneumatic gap sensor, and the transducer translates the changes in the gas pressure caused by the proximity of the casting wheel to the pneumatic gap sensor outlet into a signal intelligible to a control device. As appropriate, the control device regulates the relative positions of the casting nozzle and the casting wheel so that a desired gap can be maintained.

BRIEF DESCRIPTION OF THE DRAWINGS

The following drawings incorporated in and forming a part of the specification illustrate several aspects of the present invention and together with the description serve to explain the principles of the invention. I the drawings.

DETAILED DESCRIPTION OF THE INVENTION

Figure 1:
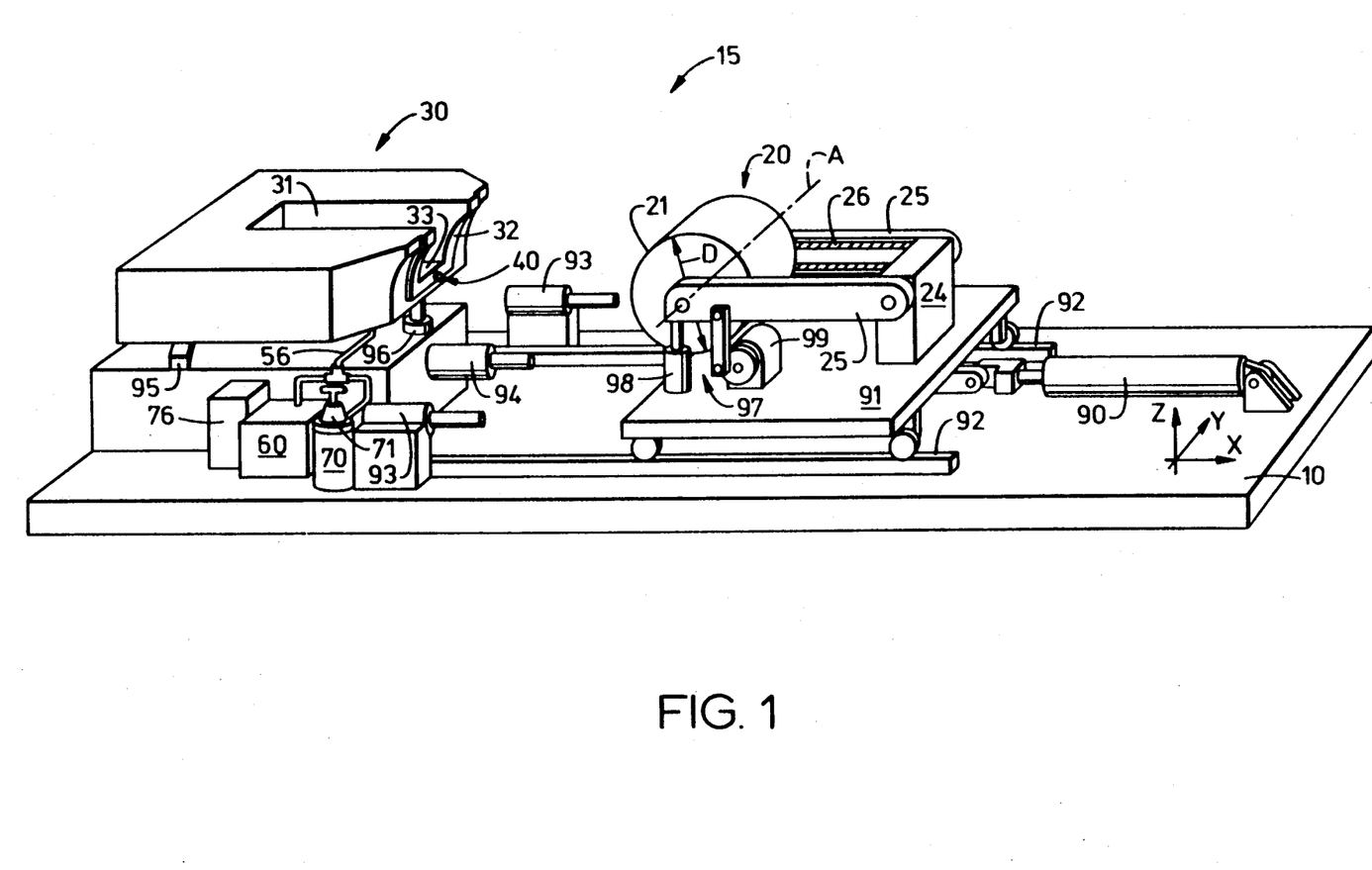
FIG. 1 is a partial perspective view of a casting station in which a preferred embodiment of the present invention is illustrated.

Referring now to the drawings in detail, wherein like numerals indicate corresponding elements throughout the views, FIG. 1 illustrates a partial perspective view of a casting station 15 located on a longitudinal bed 10. Casting station 15 will preferably comprise casting nozzle 30 and casting wheel or substrate 20. In a preferred embodiment, casting wheel 20 is rotatably mounted on arms 25 such that casting wheel 20 may be rotated by any means about an axis substantially parallel to the upper surface of longitudinal bed 10.

Arms 25 are rotatably mounted at one end to supporting block 24 such that arms 25 may be rotated in an arc having an axis substantially parallel to axis A of casting wheel 20. Supporting block 24 is securely attached to table 91 and may comprise a motor (not shown) for rotating wheel 20 by means such as drive linkage 26. Drive linkage 26 may comprise any coupling, belt, chain, rod or the like for rotating casting wheel 20. Alternatively, casting wheel 20 may be rotated by any means, such as a motor, provided along axis A of casting wheel 20.

Casting wheel 20 is preferably generally cylindrical in shape and rotatable about a central axis A. Casting wheel 20 is preferably rotated at between about 50-5000 feet/min. (15-1500 meters/min.) surface speed for typical strip or foil casting. Obviously such surface speed will be a function of the rotational speed of casting wheel 20 and diameter D thereof. However, as will become apparent herein, the present invention is not dependent upon the speed of the casting wheel.

It should be understood that configurations for substrate 20 other than cylindrical conformations may be employed. For example, a casting wheel with a smooth frustoconical outer peripheral surface or a belt-like continuous moving substrate (not shown) might equally be utilized. Regardless of the configuration of the wheel, drum, or other substrate employed, the casting surface should be at least as wide as the strip of material to be cast.

In a preferred embodiment, casting wheel 20 comprises a water cooled copper alloy wheel. Copper and copper alloys are preferred for their high thermal conductivity and favorable wear resistance. However, within the spirit of the present invention, steel, brass, aluminum, aluminum alloys, and other materials may equally be utilized.

In the operation of strip casting station 15 such as shown in FIG. 1, the surface 21 of casting wheel 20 preferably must also be able to absorb and/or dissipate heat generated from contact with molten material in order to facilitate cooling of the cast material. As mentioned, in a preferred arrangement heat is removed from casting wheel 20 by circulating a sufficient quantity of water to the interior and/or exterior surfaces of casting wheel 20. Refrigeration techniques or similar cooling arrangements may also be employed to cool casting wheel 20. The use of cooling channels within a casting substrate is known in the industry and will not be further described herein. Likewise, casting wheel 20 may be cooled with the use of a medium other than water, including other cooling fluids such as freon, coolants, and the like. Water is chosen for its low cost, ready availability, and relative general safety.

During casting procedures, casting nozzle 30 is spaced in close proximity to surface 21 of casting wheel 20. Casting nozzle 30 is constructed of any material suitable for casting such as silica brick or the like. In general, for obvious reasons, such materials preferably have a melting point higher than that of the molten material to be introduced into the casting nozzle. Casting nozzle 30 may be of any suitable shape such that casting nozzle face 32 of casting nozzle 30 may be brought into close proximity with surface 21 of casting wheel 20 during casting. It is understood that casting nozzle 30 should be sufficiently warm before molten material is introduced therein so that the molten material does not generally solidify within channel 31 but instead flows onto substrate 20.

Casting nozzle face 32 preferably protrudes from the surface of casting nozzle 30 adjacent surface 21 so as to limit the overall area of nozzle 30 which will be in close proximity with surface 21 during casting operations. Due to the generally higher steady state temperature of casting nozzle 30 relative to the preferably cooler casting substrate 20, limiting the area of nozzle 30 in close proximity with surface 21 helps to minimize the transfer of heat energy from nozzle 30 to casting substrate 20. In addition, casting nozzle face 32 preferably has a conformation corresponding to and approximately the same radius of curvature as adjacent surface 21 of casting wheel 20, so that a predetermined distance can be substantially uniformly maintained between casting nozzle face 32 and the adjacent surface 21 of casting wheel 20 over substantially the entirety of these opposed surfaces.

Figure 2:
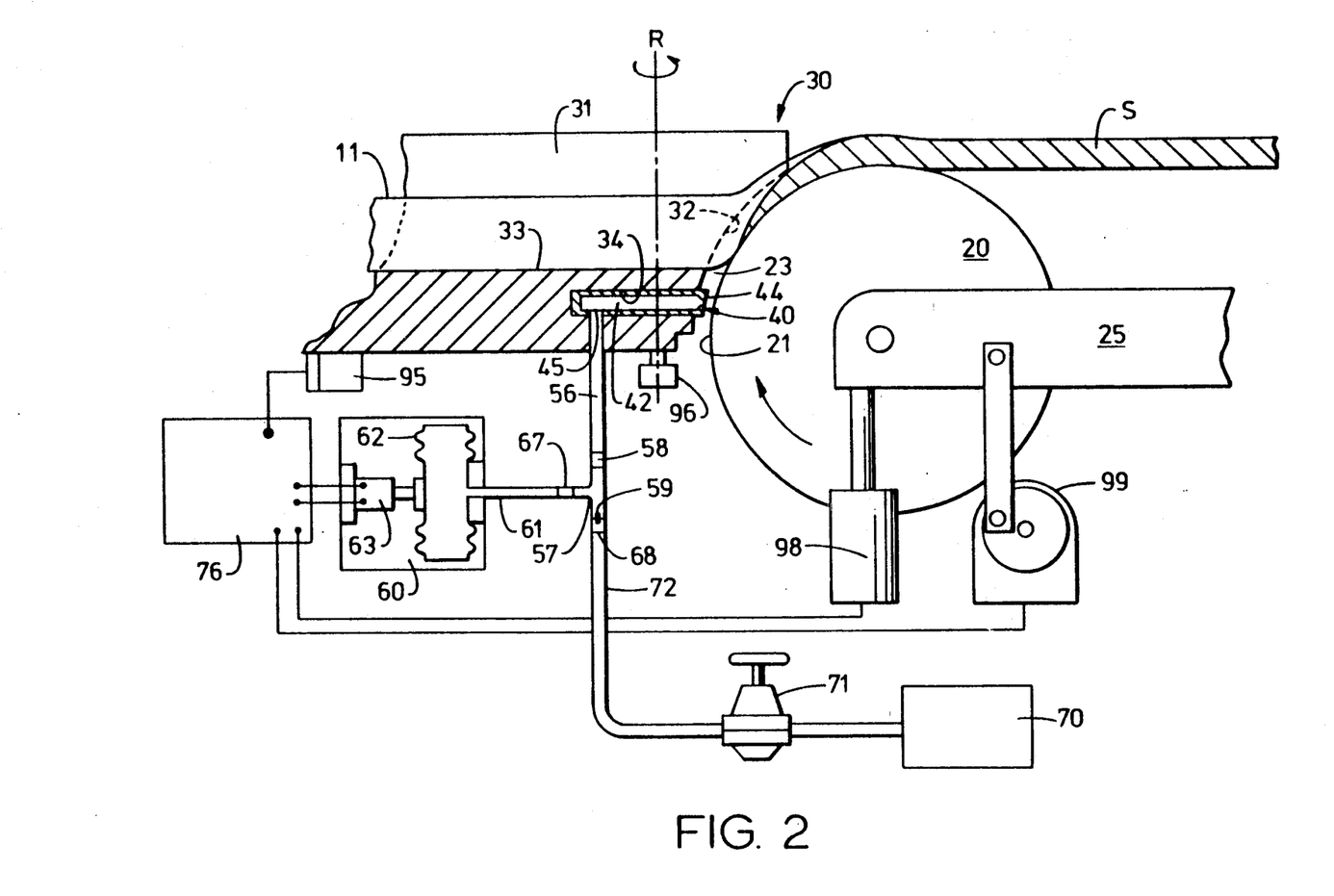
FIG. 2 is a partial cross-sectional schematic view of the casting station of FIG. 1.
Figure 3:
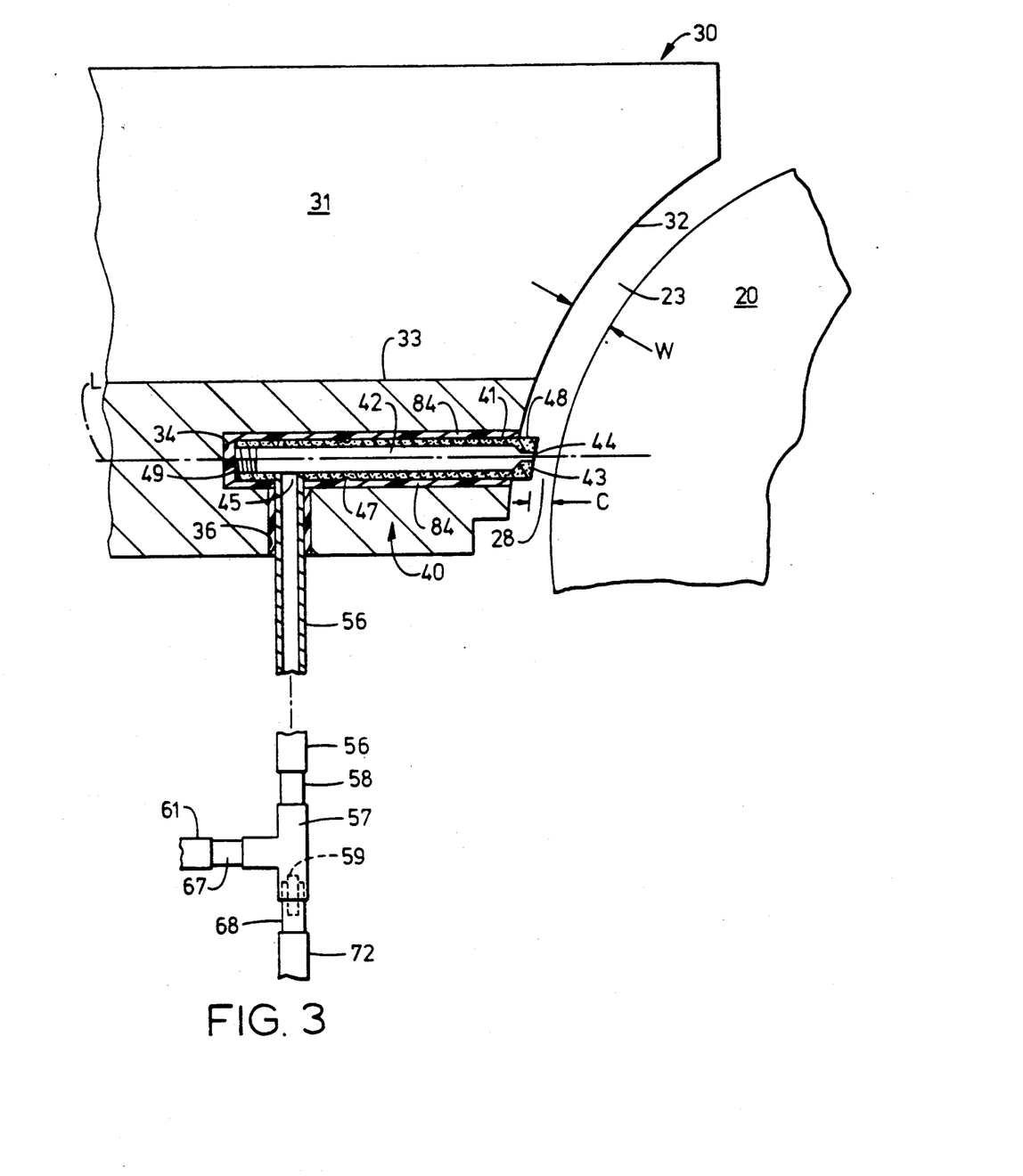
FIG. 3 is an enlarged partial cross-sectional view of the pneumatic gap sensor and pipe tee connector of FIG. 2.

As illustrated in FIGS. 1-3, within casting nozzle 30 is preferably provided a channel 31 for directing the flow of molten material onto casting wheel 20. Channel 31 may be of any suitable shape to facilitate the flow of molten material towards casting wheel 20. As shown, bed 33 provides the lower portion of channel 31.

As best seen in FIG. 2, when molten material 11 is introduced into casting nozzle 30, it flows within channel 31, along bed 33, and onto casting wheel 20. A gap 23 is preferably maintained between casting wheel 20 and casting nozzle 30 so that casting wheel 20 may freely rotate and the desired thickness of material may be cast. Gap 23 is the distance between the closest opposed points on casting nozzle face 32 and surface 21 of casting wheel 20. During typical strip casting, gaps in a range of between about 0.005" (0.125 mm) and about 0.030" (0.75 mm) are usually desired. However, the invention disclosed herein is not theoretically limited by the dimension of gap 23 and may be generally utilized within the practical limits of molten material 11 flowing from casting nozzle 30 to casting wheel 20. As discussed herein, the present invention may be utilized when molten material 11 is cast at temperatures associated with red heat, typically over 1000° F. (over 604° C).

Due to the flow, viscosity and inherent surface tension of molten material 11, the molten material effectively generally flows across gap 23 and onto casting wheel 20 as generally illustrated in FIG. 2. During casting, surface 21 of casting wheel 20 adjacent to bed 33 is rotating generally upwardly relative to bed 33 as it passes nozzle face 32 so that molten material 11 is deposited on casting wheel 20 and carried towards the top of the casting wheel. During casting operations, it is preferable to deposit molten material 11 on the upper quadrant of surface 21 adjacent to casting nozzle 30.

Referring now to FIG. 2, due to the cooling characteristics of casting wheel 20, molten material 11 generally begins solidification after initial contact with surface 21 of casting wheel 20. As shown with cross-hatching, as molten material 11 solidifies and cools on surface 21, molten material in contact with the solidified material likewise generally cools and solidifies on the previously deposited material, generally increasing the thickness of solidified material on surface 21 downstream. During typical drag flow casting, the resulting thickness of cast material produced is principally determined by the speed and temperature of surface 21 and the length of the arc over which molten material 11 contacts surface 21 and the solidified material thereon. In addition, the vertical sides of channel 31 adjacent to surface 21 may limit the transverse spreading (i.e. the lateral outward spreading from the sides of channel 31) of molten material 11 which has been deposited on substrate 20 yet has not solidified prior to exiting channel 31. Upon solidification, the cast material is thereafter removed from the casting wheel, as strip cast S.

In order to maintain gap 23 at a predetermined width, a preferred embodiment of pneumatic gap sensor 40 of the subject invention is shown in FIGS. 1-3. As best seen in FIG. 3, sensor 40 preferably comprises a sensor body 41 and is provided adjacent casting nozzle face 32 such that surface 21 of casting wheel 20 will pass in front of sensor 40 when in proximity. Sensor 40 is preferably secured to casting nozzle 30 such as within a cavity 34. Cavity 34 is preferably located beneath bed 33 to effectively space sensor 40 away from the flow of molten material, and to minimize the potential for direct contact with such molten material. It is also understood that cavity 34 and sensor 40 should be located sufficiently below bed 33 to avoid compromising the integrity of bed 33 (in applications where sensor 40 is actually mounted bodily within nozzle 30) so that molten material may flow thereover without damage to bed 33 or casting nozzle 30. Sensor 40 can operate reliably when located within about 0.5" (12.5 mm) of bed 33.

As mentioned, the present invention is constructed to withstand the hostile conditions and high temperatures associated with casting and may encounter temperatures over 1000° F. (over 604° C.) due to its proximity to molten material 11. Although the pneumatic sensor of the present invention may be mounted at a variety of positions on the exterior of casting nozzle 30 so long as surface 21 of casting wheel 20 travels in front thereof, it is preferred that sensor 40 be located as close as practical to the region where molten material is actually transferred from casting nozzle 30 to casting substrate 20. It is only by such proximate positioning that a true determination of the actual casting gap can be reliably achieved, and it is this close positioning that gauging devices and methods heretofore available have lacked and generally could not survive the attendant environment. In the preferred embodiment disclosed herein, sensor 40 is secured at least partially within nozzle 30, as illustrated in FIGS. 1-3.

Cavity 34 is generally cylindrical in shape and extends from casting nozzle face 32 inward into casting nozzle 30. It should be noted that cavity 34 may be of any shape (e.g. cylindrical, square, rectangular, etc.) appropriate for securing sensor body 41 therein. As shown in FIG. 3, sensor body 41 is also preferably generally cylindrical in shape, and is secured within cavity 34 such as by means of a high temperature refractory adhesive 84.

A depression or recess 47 is provided about a portion of sensor body 41 within casting nozzle 30. Depression 47 preferably circumscribes the exterior periphery of sensor body 41 and is preferably utilized where adhesive 84 will not rigidly attach to sensor body 41 or to augment the connection. When the adhesive within depression 47 hardens to the adjacent portion of cavity 34 in casting nozzle 30, it may thereby function as a mechanical lock for more rigidly securing sensor body 41 within cavity 34. However, any other attachment and/or securing means may be utilized for mounting sensor body 41 on nozzle 30.

One or more gap sensors 40 will be provided to continually monitor gap 23 during casting procedures. Sensor face 43, the distal end of sensor body 41 most closely adjacent to casting wheel 20, also preferably has a conformation corresponding to and of approximately the same radius of curvature as adjacent surface 21 of casting wheel 20. Where sensor face 43 is not provided with such conformation before installation of sensor body 41 within cavity 34, sensor face 43 may be appropriately dressed to proper conformation (as discussed herein) by placing an abrasive surface, such as emery paper, against the adjacent surface 21 of casting wheel 20. When surface 21 is brought into contact with sensor face 43, the abrasive surface will substantially conform to the curvature of adjacent surface 21 and may thereby be utilized to abrade sensor face 43 to the curvature of adjacent surface 21.

A chamber 42 is provided within sensor body 41, preferably extending substantially along the internal longitudinal axis L of sensor body 41. An outlet orifice 44 is provided in sensor face 43, preferably oriented coaxially along axis L, and in fluid communication with chamber 42. In a preferred embodiment, chamber 42 and outlet orifice 44 are generally cylindrical in shape; however, they may be any appropriate shape (e.g. cylindrical, square, rectangular, etc.) such that a fluid may pass therethrough. Furthermore, outlet orifice 44 preferably has a smaller diameter than chamber 42.

As will be further discussed herein, it is preferable that sensor body 41 comprise a material with a low coefficient of thermal expansion so that the length of the portion (i.e. protrusion 48) of sensor body 41 extending outwardly from nozzle face 32 does not significantly change as sensor body 41 is exposed to temperature variations. The portion of sensor body 41 extending from casting nozzle face 32 must also be able to withstand the relatively hostile oxidation conditions and attendant environment created by the flow of molten material onto a cooler substrate. Boron nitride may be a preferred material due to its low coefficient of thermal expansion and superior resistance to oxidation. Quartz may also be utilized in appropriate circumstances.

In a preferred embodiment, chamber 42 is bored within sensor body 41 from the end of sensor body 41 opposite sensor face 43. A plug 49 may be attached within chamber 42 to seal the rearward end of chamber 42 following such boring operation. As best shown in FIG. 3, plug 49 may be threaded into the rearward end of sensor body 41; however, plug 49 may be attached within chamber 42 with other securing means such as an adhesive. Plug 49 preferably comprises a material having a coefficient of thermal expansion corresponding to that of sensor body 41, such as boron nitride.

A passageway 36 is provided in casting nozzle 30 which communicates with cavity 34. Passageway 36 is also preferably generally cylindrical in shape; however, passageway 36 may be of any appropriate shape (e.g. cylindrical, square, rectangular, etc.) for securing a conduit 56 therein. As shown in FIG. 3, conduit 56 is also preferably generally cylindrical in shape, hollow, and secured within passageway 36 such as by means of a high temperature refractory adhesive. Any other attachment and/or securing means may be utilized for attaching conduit 56 within passageway 36. Conduit 56 is preferably a protection tube comprised of any suitable material such as alumina, heat resistant stainless steel, ceramic, or boron nitride. Conduit 56 may be of any appropriate shape such that a fluid may pass therethrough.

An inlet orifice 45 is provided in sensor body 41 through which conduit 56 may communicate with chamber 42. In the preferred embodiment shown in FIG. 3, an open end of conduit 56 is attached to sensor body 41 within inlet orifice 45. The end of conduit 56 is preferably threadly attached within inlet 45 and adhesive may also be applied around the connection before attachment to inlet 45. Inlet orifice 45 is preferably cylindrical in shape and the attached end of conduit 56 should have a substantially similar conformation with inlet orifice 45. As shown in FIGS. 2 and 3, the other end of conduit 56 is connected to pipe tee connector 57 via connector 58.

Figure 4:
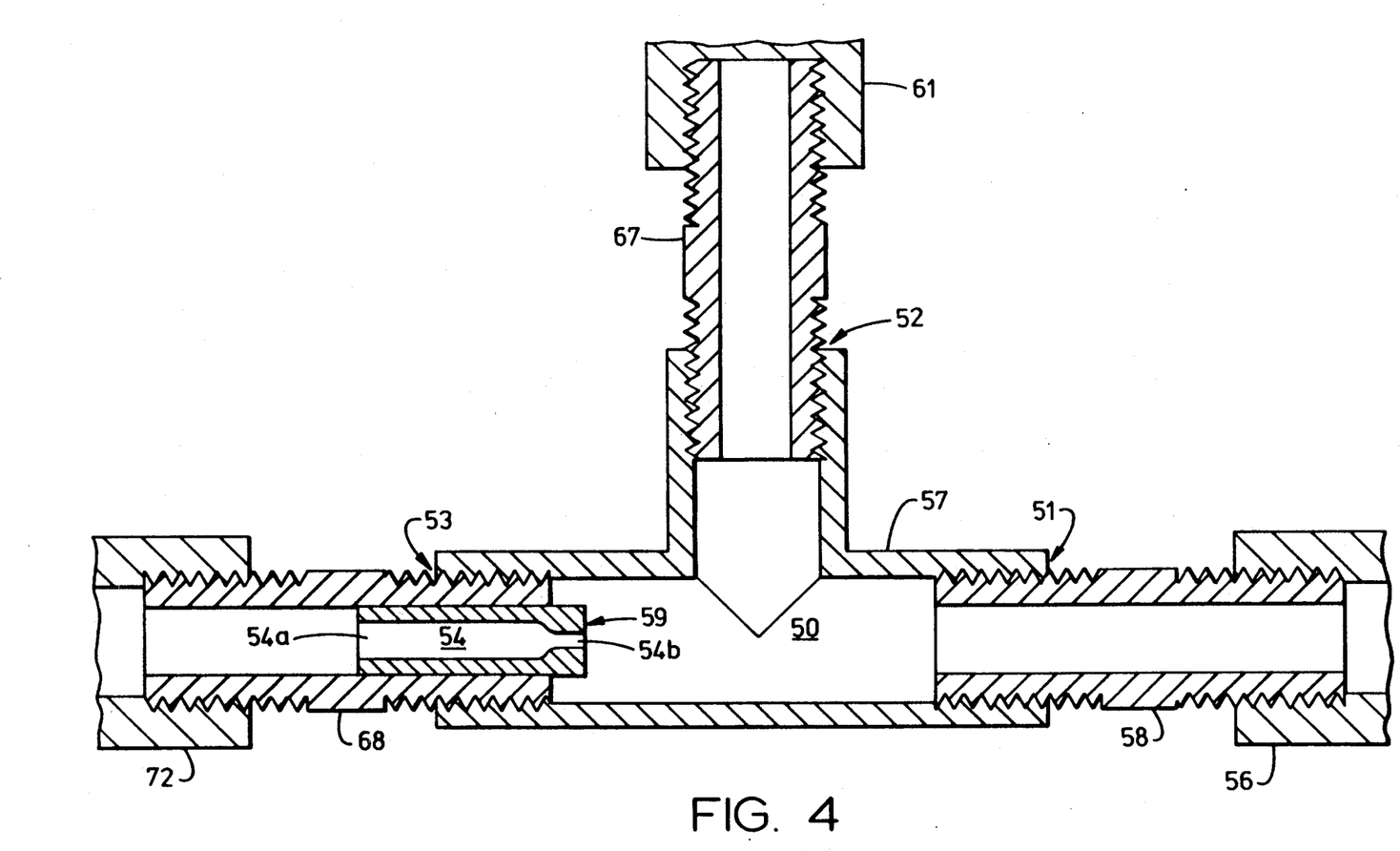
FIG. 4 is a cross-section view of the pipe tee connector of FIGS. 2 and 3.

As best seen in FIG. 4, connector 58 is generally cylindrical in conformation with external threads of both ends, and is preferably hollow such that a fluid may travel therethrough from conduit 56 to pipe tee connector 57. Provided within pipe tee connector 57 is a duct 50 having three openings or "branches" 51, 52, and 53 through which a fluid may travel and to each of which are separately connected conduit 56, transducer tube 61, and regulator tube 72, respectively. Transducer tube 61 is preferably connected to opening 52 in pipe tee connector 57 by means such as connector 67. Regulator tube 72 is preferably connected to opening 53 in pipe tee connector 57 by means such as connector 68. However, any means may be utilized for attaching transducer tube 61, regulator tube 71, and conduit 56 to each respective opening of pipe tee connector 57.

As disclosed in the present invention, connectors 58, 67 and 68 are used to connect two devices having internal connecting threads and thus may be eliminated if transducer tube 61, regulator tube 72, or conduit 56 may be otherwise respectively attached to pipe tee connector 57. Transducer tube 61 and regulator tube 72 may comprise conventional tubing such as plastic through which a fluid may pass. Connectors 58, 67 and 68 may comprise stainless steel, plastic, rubber, or any other suitable material.

A flow restrictor 59 is provided within connector 58 attaching regulator tube 72 to pipe tee connector 57. Flow restrictor 59 comprises a canal 54 through which a fluid may travel between regulator tube 72 and pipe tee connector 57. Canal 54 further comprises a restrictor inlet 54a and a restrictor outlet 54b. In the preferred embodiment illustrated in FIG. 4, canal 54, restrictor inlet 54a and restrictor outlet 54b are generally cylindrical in shape. Restrictor outlet 54b preferably has a smaller diameter than restrictor inlet 54a such that a resistance to the flow of a fluid from regulator 71 to pipe tee connector 57 and sensor 40 is created. This resistance allows for the maintenance of a predetermined pressure in regulator tube 72 even as the pressure within sensor 40 varies, as further discussed herein. Flow restrictor 59 can be formed of stainless steel, rubber, plastic, or any other suitable material, and is preferably attached within connector 58 by any secure means such as an adhesive.

As shown in FIG. 2, regulator tube 72 is connected to a means (e.g. regulator 70) for precisely supplying a predetermined fluid pressure to flow restrictor 59. An example of a suitable precision device which can provide a reliably consistent pressure is the Model 10 Fairchild-Hiller Regulator. The fluid supplied is preferably an inert gas such as argon. The supply of an inert gas to the vicinity of the interface of molten material 11 and surface 21 will help minimize undue oxidation as well. The application of an inert gas at the casting interface to reduce oxidation is known in the industry.

The other end of transducer tube 61 is connected to a sensitive pressure monitoring device, such as transducer 60. Transducer 60 is illustrative of any device capable of detecting and/or measuring changes in pressure in the flow of a gas supplied to sensor 40. As best seen in FIG. 2, transducer 60 may include bellows 62 and linear transducer 63. The presence of gas pressure in bellows 62 causes deflection in a manner which can be monitored by linear transducer 63. Pressure changes in bellows 62 generally produce different bellow deflections which, when sufficiently large, are detectable by linear motion induced in a piston of transducer 63.

A suitable transducer unit for use with the present invention is Model 80 Transducer, manufactured by Unimeasure of Pasadena, Calif. However, any suitable transducer or pressure monitoring device may be used to monitor the pressure in sensor 40.

The system through which fluid from supply 70 travels should be substantially closed such that it may only exit the system through outlet orifice 44. It is therefore preferred that the various connections, as heretofore discussed, should be substantially secure so as to limit the unintentional loss of fluid from the system. It is preferable to maintain the smallest possible volume of fluid in transducer tube 61, pipe tee connector 57, connectors 58, 67 and 68, conduit 56, and sensor 40, such that changes in pressure in sensor 40 will generally be more quickly transmitted to transducer 60 and the system will more accurately control gap width variations. While a constant regulator pressure of 20 psi is preferred, a variety of pressures may by utilized.

Due to the porosity of the refractory materials generally used for casting nozzle 30, sensor body 41 and plug 49 are provided to limit the unintentional loss of fluid from the pneumatic system. However, in an alternative embodiment of the present invention (not shown), plug 49 and/or sensor body 41 may be eliminated if casting nozzle 30 comprises a substantially non-porous material. In this alternative embodiment, fluid may be introduced under pressure into cavity 34 and expelled through an opening provided in sensor face 32.

In operation, regulator 71 selectively supplies a precise pressure of gas from fluid supply 70 to flow restrictor 59. As mentioned, due to the resistance provided by flow restrictor 59, a precise pressure can be maintained in regulator tube 72. The gas supply passing through flow restrictor 59 is supplied to transducer 60 and sensor 40 by means such as transducer tube 61 and conduit 56, respectively. The gas supplied to sensor 40 enters chamber 42 through inlet orifice 36 and is forced under pressure through outlet orifice 44 into gap 28 when outlet orifice 44 is at least partially unobstructed. Gap 28 is the distance between the closest opposed points on sensor face 43 and surface 21 of casting wheel 20. As can be understood, where sensor face 43 is flush with nozzle face 32, gap 28 should equal gap 23.

When surface 21 of casting wheel 20 is brought into sufficient proximity with outlet orifice 44, the gas exiting sensor 40 impinges upon the adjacent surface 21. The presence of surface 21 thereby creates a resistance to the flow of gas from outlet orifice 44, reducing the amount of gas that may exit sensor 40 over a given period of time. If the clearance C of gap 28 is reduced to zero (or outlet orifice 44 is sealed), the gas pressure between flow restrictor 59 and outlet orifice 44 will generally correspond to the gas pressure provided by regulator 71, since gas is not flowing through the system.

If gap 28 is made significantly large, which for most applications of the present invention is a clearance C of gap 28 greater than 0.015" (0.375 mm), the pressure between flow restrictor 59 and outlet orifice 44 will stabilize at some pressure between the supply pressure and atmospheric pressure. This pressure difference above atmospheric pressure is directly related to the restriction characteristics of outlet orifice 44, since it is preferably smaller in diameter than chamber 42, as described herein.

Figure 6:
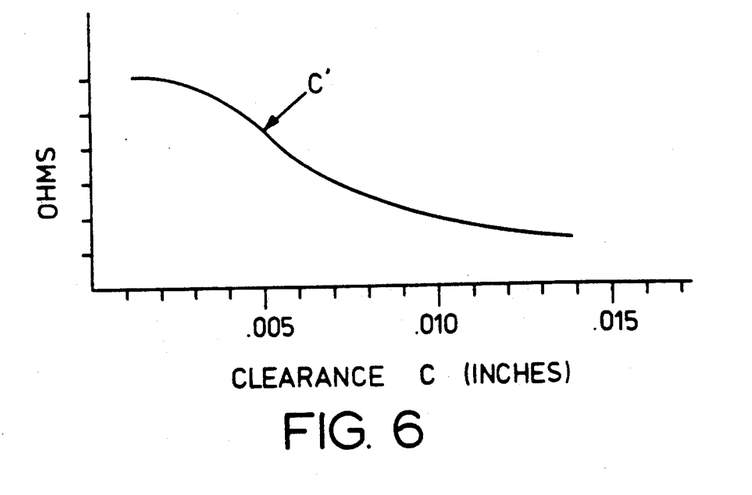
FIG. 6 is a graphical representation illustrating a typical response of the pneumatic gap sensor of the present invention.

It can thus be understood that when clearance C of gap 28 changes, the pressure between flow restrictor 59 and outlet orifice 44 will generally change accordingly, and can be detected by transducer 60. The graph shown in FIG. 6 illustrates the general non-linear relationship between clearance C of gap 28 and the pressure within sensor 40 (as measured in ohms).

As previously discussed, sensor body 41 may comprise protrusion 48 such that sensor face 43 extends beyond nozzle face 32. Protrusion 48 may be utilized to position sensor face 43 a predetermined distance from surface 21 such that sensor 40 is more sensitive to changes in gap 28. As previously mentioned, FIG. 6 illustrates the general relationship between clearance C of gap 28 and the pressure within sensor 40 (as measured in ohms). In one particular embodiment of the present invention which was constructed, sensor 40 had an operating range of approximately 0.003" (0.075 mm) to about 0.015" (0.375 mm). There generally exists within the operating range of sensor 40 a clearance C' around which sensor 40 is generally most sensitive to changes in gap 28. As shown in FIG. 6, C' corresponds to the maximum slope of the line representing the relationship between clearance C and the pressure in sensor 40. In a constructed embodiment of the present invention, sensor 40 was generally most sensitive to changes to gap 28 when clearance C was in the range of about 0.005" (0.125 mm) to about 0.011" (0.275 mm), and more particularly about a clearance C of approximately 0.005" (0.125 mm). The length of protrusion 48 necessary to position sensor face 43 a distance from nozzle face 32 at which sensor 40 is most sensitive to changes in gap 28 (and therefore gap 23) may be calculated by subtracting desired operating clearance C from the desired width W. The operating range of sensor 40 and it associated region of increased sensitivity will depend upon a variety of factors such as the pressure of gas supplied to sensor 40 and the diameter of outlet orifice 44.

In one embodiment of the present invention, sensor face 43 is positioned such that clearance C of gap 28 approximates C'. If a particular embodiment of sensor 40 should be most sensitive to changes in gap 28 near either extreme of its operating range, it is preferable that sensor face 43 be located such that clearance C of gap 28 is within the operating range of sensor 40 so that gap 28 may be accurately monitored as gap 28 either increases or decreases. For example, sensor face 43 may be preferably positioned away from surface 21 such that clearance C lies at about the midpoint of the preferred operating range of sensor 40.

As can be understood, protrusion 48 may be utilized to measure a width W of gap 23 greater than the operating range of sensor 40. So long as the desired width W of gap 23 is within the operating range of sensor 40, sensor face 43 may be flush with nozzle face 32. When sensor face 43 is flush with nozzle face 43, gap 28 will equal gap 23. However, where sensor face 43 is provided flush with nozzle face 32 and desired gap 23 becomes sufficiently large, which is generally when width W of gap 23 is greater than 0.015" (0.375 mm), the proximity of casting wheel 20 to sensor face 43 becomes increasing difficult to accurately measure due to the limited restrictive effect of distanced surface 21. In order to monitor a width W of gap 23 greater than the operating range of sensor 40, sensor face 43 is preferably extended towards surface 21 so that clearance C of gap 28 is within the operating range of sensor 40. The width W of gap 23 can thereby be calculated as the sum total of clearance C and the distance which sensor face 43 protrudes from nozzle face 32.

The measurement of the pressure within sensor 40 is transmitted from transducer 60 to control 76, which is provided for operation of the means (e.g. 90, 95 and 97) for adjusting the relative position of casting nozzle face 32 and casting surface 21. Control 76 is preferably a computer capable of maintaining a predetermined gap between nozzle 30 and surface 21 by an adjustment means, such as first axis adjustment means 90, based upon the pressure readings of transducer 60.

In a preferred operation of the present invention, control 76 is calibrated using well known techniques to maintain gap 23 at a predetermined width W. For example, surface 21 of casting wheel 20 may be moved into close proximity with casting nozzle face 32 such that gap 23 approximates a predetermined width W. The corresponding transducer reading can then be maintained during casting procedures by operation of the means (e.g. 90, 95, 97) for adjusting the relative position of casting nozzle face 32 and the adjacent surface 21 of casting wheel 20. Whenever gap 23 should deviate from width W, control 76 preferably adjusts the relative positions of casting nozzle 30 and substrate 20 until transducer 60's pressure reading corresponds to the calibrated pressure reading for width W of gap 23. When protrusion 48 is provided, control 76 may be calibrated to maintain a desired clearance C of gap 28.

In an alternative preferred embodiment, control 76 may be programmed to linearize the relationship between gap 28 and the pressure readings of transducer 60 to determine the relative distance between sensor face 43 and the adjacent surface 21 of casting wheel 20. The relative positions monitored by measurement of pressure changes can thereby be calibrated to determine absolute distances and maintain a predetermined relationship between the nozzle and the wheel. Where sensor face 43 is flush with nozzle face 32, transducer 60's pressure readings will correspond with width W of gap 23. If protrusion 48 is provided, width W of gap 23 may be calculated as the sum total of clearance C and the distance which sensor face 43 protrudes from casting nozzle face 32 (i.e. the length of protrusion 48).

As shown in FIG. 1, a sensor 40 is provided on casting nozzle face 32 in close proximity to bed 33. Based upon the pressures registered by sensor 40, casting nozzle 30 and casting wheel 20 can be continually adjusted during casting operations along essentially any plane or about any axis in the X—Y—Z triordinate system illustrated by a variety of mechanical means. Where only one sensor 40 is utilized, first axis adjustment means 90 is preferably provided to regulate the relative position of nozzle face 32 and surface 21 along the X axis. Although a variety of adjustment means may be utilized in conjunction with a single sensor 40, the determination of the width W of gap 23 at a single location generally limits the information which may be obtained regarding the width W of gap 23 along other portions of nozzle face 23. Pivot point 96 and track 95 are provided to rotate nozzle 30 about point 96 to enable adjustments along the X and Y axes, while adjustment means 97 with arms 25 permit adjustment of wheel 20 along the X and Z axes.

When molten material is introduced through casting nozzle 30 and onto casting wheel 20, those areas of nozzle 30 and wheel 20 in closest proximity or contact with the molten material generally experience greater thermal expansion than the rest of nozzle 30 and substrate 20, respectively. In practice, the portions of nozzle 30 and substrate 20 generally located along the flow of the molten material expand the greatest such that the adjacent central portions of nozzle 30 and wheel 20 generally expand toward each other. During casting procedures, the width W of gap 23 between surface 21 and the centerpoint of bed 33 adjacent surface 21 is generally less than the width of a gap between surface 21 and a point located on the periphery of casting nozzle 30. Placement of sensor 40 near the centerpoint of bed 33 adjacent to surface 21 generally can help to ensure that casting nozzle 30 does not contact casting wheel 20.

Figure 5:
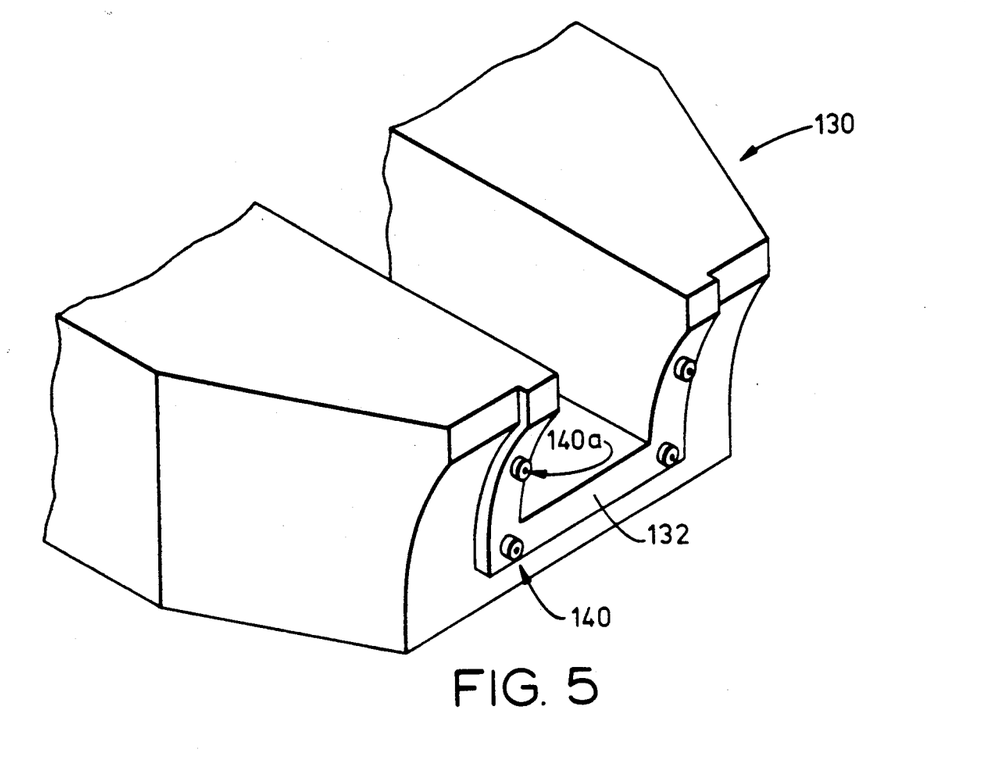
FIG. 5 is a partial perspective view of a casting nozzle incorporating an alternative preferred embodiment of the present invention.

In another embodiment of the present invention, as illustrated in FIG. 5, more than one pneumatic gap sensor (e.g. 140) may be used with in conjunction with a casting nozzle (e.g. 130). Such an arrangement may be preferred for longer casting operations, or when casting wider or thicker casts, and/or where a plurality of adjustment means (e.g. 90, 95, and 97) are provided to maintain a predetermined variable width gap between nozzle face 132 and the surface of a casting substrate (not shown). In this alternative embodiment, pneumatic gap sensors 140 are installed in the casting nozzle 130 along the lower surface of casting nozzle face 132. As also illustrated, pneumatic gap sensors 140a may be installed on casting nozzle face 132 above the lower sensors. The use of a plurality of pneumatic gap sensors allows for the determination of whether specific portions of casting nozzle face 132 are a predetermined distance from a casting substrate (not shown) and can be utilized to maintain a gap with certain predetermined widths between the nozzle and the substrate.

Based upon the pressures registered by the one or more pneumatic gap sensors, casting nozzle 30 can be continually dynamically adjusted during casting operations with respect to casting wheel 20 along a variety of orientation planes or axes by a variety of mechanical means. As shown in FIG. 1, casting wheel
is positioned on table 91 which is provided for translation along the X axis, such as on rails 92. Table 91 is connected to first axis adjustment means 90 which, in a preferred embodiment, comprises a hydraulic or pneumatic piston for selectively positioning wheel 20 relative to casting nozzle 30. When surface 21 of casting wheel 20 is in proximity with casting nozzle face 32, table 91 encounters load means 93, which are disposed beside rails 92.

As shown in FIG. 1, load means 93 may operate to provide a resistance to the movement of table 91 by adjustment means 90 towards casting nozzle 30 such that any slack in the system may be minimized and precise adjustments to the relative positions for nozzle face 32 and surface 21 can be made. Furthermore, in a preferred embodiment of the present invention, first axis adjustment means 90 and load means 93 are provided to maintain a constant force to table 91 such that any elastic deformation of table 91 is held constant during its translation.

In this preferred arrangement, an adjustable stop 94 is provided for precisely translating table 91. Where first adjustment means 90 provides a constant force greater than that provided by load means 93, table 91 is positioned into contact with adjustable stop 94 during the translation of table 91. Adjustable stop 94 may thereby precisely adjust the relative position of nozzle 30 and substrate 20 without generally further elastic deformation of table 91. Adjustable stop 94 preferably comprises any precise adjustment means such as a hydraulic or pneumatic piston, or ball screw arrangement.

Where it is desirable to further control gap 23, second adjustment means 97 may be provided, preferably comprising a lift 98 and a counterlift 99. Lift 98 is illustrated as comprising a hydraulic piston to raise casting wheel 20 along the Z axis and to provide a preloaded resistance to the downward movement of casting wheel 20 by counterlift 99 such that slack in second adjustment means 97 may be minimized.. Counterlift 99 comprises a motorized cam or any other precise adjustment device.

As described herein and illustrated in FIG. 2, the molten material 11 furthest away from bed 33 solidifies on previously deposited and partially solidified material. It can thus be understood that any potential transverse spreading of molten material deposited on surface 21 above bed 33 will be spaced somewhat away from the surface 21 and towards casting nozzle face 32. A larger gap may be maintained between the upper portions of casting nozzle face 32 and surface 23 than between bed 33 and surface 21 without transverse spreading of molten material on substrate 20. Second adjustment means 97 may thereby be utilized to maintain a gap between the upper portions of nozzle face 32 and surface 21 which is different than the gap between the lower portions of nozzle face 32 and surface 21.

Since it is not generally possible to maintain a uniform gap 23 between a nozzle face 32 and a surface 21, it may be preferable to maintain a uniform gap at the four corners defining the face of channel 31 adjacent to surface 21. This can be accomplished by utilizing the four sensors (e.g 140, 140a) illustrated in FIG. 5.

Further, means 95 for rotating casting nozzle 30 about a pivot 96 having an axis R substantially perpendicular to the upper surface of longitudinal bed 10 may be provided. Means 95 for rotating casting nozzle 30 preferably comprises a hydraulic or motorized device attached to casting nozzle 30. Due to the relative small arc through which casting nozzle 30 is rotating during casting, the distal end of nozzle 30 (the end opposite casting nozzle face 32) may alternatively be moved in a substantially straight line with a hydraulic or pneumatic device, a stepping motor, or the like (not shown). A powered rotating arrangement may alternatively be provided at pivot 96. As shown in FIG. 2, pivot 96 is preferably positioned such that casting nozzle 30 may rotate about an axis R substantially perpendicular to the upper surface of longitudinal bed 10 and located as close as practical to the midpoint of bed 33 closest to surface 21.

It is understood that any variety of devices may be utilized to position casting nozzle 30, casting wheel 20, or both, so as to maintain a predetermined relationship or gap 23 between them. These adjustment means can take the form of a precision ball screw arrangement, stepping motors or the like, hydraulic or pneumatic piston devices, or any other arrangement for altering the relative positions of casting nozzle 30 and casting wheel 20. Additional adjustment devices may also be provided to move or rotate casting nozzle 30 and/or casting wheel 20 along and about any axis.

Having shown and described the preferred embodiments of the present invention, further adaptions of the pneumatic gap sensor and invention described herein can be accomplished by appropriate modifications by one of ordinary skill in the art without departing from the scope of the present invention. Several of these potential modifications have been mentioned, and others will be apparent to those skilled in the art. Accordingly, the scope of the present invention should be considered in terms of the following claims and is understood not to be limited to the details of structure and operation shown and described in the specification and drawings.

We claim:

1. In a casting system which including an apparatus for monitoring the gap between a casting nozzle and a casting surface of a substrate during casting of molten material, wherein the molten material is provided through a channel of the casting nozzle for casting onto the casting surface of the substrate for solidification, said apparatus comprising:

(a) a pneumatic gap sensor mounted at least partially within a cavity in said casting nozzle adjacent said channel and having a sensor face located within said gap between said nozzle and said casting surface of said substrate, said sensor comprising a sensor body having an internal chamber with an inlet orifice and an outlet orifice, and said sensor face with extends outwardly beyond said nozzle a predetermined distance towards said casting surface and which corresponds in conformation to said casting surface and is dressed to adjust said distance as desired, wherein said outlet orifice is formed through said face and directed toward said casting surface and said sensor body comprising material with a low coefficient of thermal expansion so that said distance which said sensor face extends beyond said nozzle does not significantly change when exposed to temperature variations;

(b) means for supply gas under predetermined pressure to said inlet orifice; and (c) means for measuring the pressure of said gas within said sensor chamber during casting procedures, whereby relative changes in said gap can be determined by corresponding changes in said measured pressure.

2. The apparatus of claim 1, further comprising means for selectively adjusting the position of said nozzle relative to said substrate to correspondingly adjust said gap therebetween.

3. The apparatus of claim 2, further comprising means for controlling said adjusting means, wherein the position of said nozzle relative to said casting surface may be adjusted by a predetermined amount in response to determined changes in said gap during casting procedures.

4. The apparatus of claim 3, further comprising means for transmitting a signal to said controlling means to initiate adjustment of the position of said nozzle relative to said casting surface a predetermined amount in response to relative changes in said gap determined by said sensor.

5. The apparatus of claim 1, wherein said nozzle comprises a bed over which molten material flows as it is discharged through said gap and onto said casting surface, and wherein said sensor is mounted within said nozzle below said bed portion and extends outwardly from said nozzle toward said casting surface to monitor said gap in close proximity to where molten material from said nozzle contacts said casting surface during casting procedures.

6. The apparatus of claim 1, wherein said sensor body is formed at least in part of materials having a low coefficient of thermal expansion selected from a group including boron nitride and quartz.

7. The apparatus of claim 1, wherein said substrate comprises a moving casting surface which is cooled to facilitate solidification of said molten material as it is cast onto said casting surface during casting procedures.

8. The apparatus of claim 3, further comprising means for implementing adjustment of said relative positions of said nozzle and said casting surface as necessary to maintain a predetermined gap therebetween.

9. The apparatus of claim 5, further comprising a plurality of sensors, wherein at least one sensor is mounted at least partially within said casting nozzle above said bed.

10. The apparatus of claim 1, further comprising a plurality of sensors spaced from one another on said nozzle to monitor the gap between said nozzle and said casting surface along a plurality of axes.

11. The apparatus of claim 10, wherein said adjusting means further comprises means for adjusting the relative positions of the nozzle and casting surface along a plurality of axes in order to facilitate more uniform control of said gap between these parts during casting procedures.

12. The apparatus of claim 1, wherein a clearance is provided between said sensor face and said casting surface, and said sensor face extends outwardly beyond said nozzle a predetermined distance towards said casting surface such that said clearance between said casting surface and said sensor face can be determined.

13. The apparatus of claim 1, wherein said means of supplying gas under predetermined pressure to said inlet orifice comprises a conduit connected to a fluid supply, and said means for measuring the pressure of said gas comprises a transducer tube attached to said conduit, said transducer tube further connected to a transducer.

14. In a casting system which including an apparatus for monitoring the gap between a casting nozzle and a casting surface of a substrate during casting of molten material, wherein the molten material is provided through a channel of the casting nozzle for casting onto the casting surface of the substrate for solidification, said apparatus comprising:

(a) a plurality of pneumatic gap sensors mounted at least partially within respective cavities in said casting nozzle adjacent said channel and each having a sensor face located within said gap between said nozzle and said casting surface of said substrate, said sensors each comprising a sensor body having an internal chamber with an inlet orifice and an outlet orifice, and said sensor face extending outwardly beyond said nozzle a predetermined distance towards said casting surface and which corresponds in conformation to said casting surface and is dressed to adjust said distance as desired, wherein said outlet orifice is formed through said face and directed toward said casting surface and said sensor body comprising material with a low coefficient of thermal expansion so that said distance which said sensor face extends beyond said nozzle does not significantly change when exposed to temperature variations;

(b) means for supplying gas under predetermined pressure to said sensor orifices;

(c) means for measuring the pressure of said gas within said sensor chambers during casting procedures, whereby relative changes in said gap can be determined by corresponding changes in said measured pressure; and (d) means for selectively adjusting the position of said nozzle relative to said substrate to correspondingly adjust said gap therebetween.

15. The apparatus of claim 14, further comprising means for controlling said adjusting means, wherein the position of said nozzle relative to said casting surface may be adjusted by a predetermined amount in response to determined changes in said gap during casting procedures.

16. The apparatus of claim 14, wherein said sensors are spaced from one another on said nozzle to monitor the gap between said nozzle and said casting surface along a plurality of axes.

17. The apparatus of claim 16, wherein said adjusting means further comprises an arrangement for adjusting the relative positions of the nozzle and casting surface along a plurality of axes in order to facilitate more uniform control of said gap between these parts during casting procedures.

18. A method for monitoring the gap between a casting nozzle and a casting surface of a substrate for continuous casting of molten material, said method comprising the following steps:

(a) providing a casting nozzle with a channel for directing the flow of molten material, said nozzle having a pneumatic sensor mounted at least partially within a cavity in said nozzle adjacent said channel and having a sensor face located within said gap between said nozzle and said casting surface of said substrate, said sensor comprising a sensor body having an internal chamber with an inlet orifice and an outlet orifice, and said sensor face extending outwardly beyond said nozzle a predetermined distance towards said casting surface, wherein said outlet orifice is formed through said face and directed toward said casting surface and said sensor body comprises material with a low coefficient of thermal expansion so that the distance which said sensor face extends beyond said nozzle does not significantly change when exposed to temperature variations, and said nozzle having means for supplying gas under predetermined pressure to said inlet orifice and means for measuring the pressure of said gas within said sensor chamber during casting procedures, whereby relative changes in said gap can be determined by corresponding changes in said measured pressure;

(b) locating said nozzle and said casting surface is proximity with one another and having a predetermined gap therebetween, and dressing said sensor face to correspond in conformation to said casting surface and to adjust said predetermined distance as desired;

(c) providing molten material to said nozzle for casting onto said casting surface;

(d) supplying gas at a predetermined pressure to said inlet orifice of said sensor during casting procedures; and (e) monitoring the gap between said nozzle and said casting surface during casting procedures by determining the pressure of said gas within said sensor.

19. The method of claim 18, further comprising the step of implementing said adjusting means to selectively adjust the position of said nozzle relative to said casting surface in response to determined changes in said gap during casting procedures.

20. The method of claim 19, wherein said casting nozzle is provided with a plurality of sensors spaced from one another such that the gap between said nozzle and said casting surface can be monitored along a plurality of axes.

21. The method of claim 20, wherein said step of implementing said adjusting means enables adjustment of the relative positions of said nozzle and said casting surface along a plurality of axes in order to facilitate more uniform control of said gap between these parts during casting procedures.

* * * * *

UNITED STATES PATENT AND TRADEMARK OFFICE
CERTIFICATE OF CORRECTION

PATENT NO. : 5,092,392

DATED : March 3, 1992

INVENTOR(S) : Karl T. Bagdal, Edward L. King, Donald W. Follstaedt

It is certified that error appears in the above-indentified patent and that said Letters Patent is hereby corrected as shown below:

Column 16, Claim 14, Line 24, "comprising" should be deleted and replaced with --comprises--.

Column 17, Claim 18, line 15, "is" should be deleted and replaced with --in--.

Signed and Sealed this

Thirteenth Day of July, 1993

Attest:

MICHAEL K. KIRK

Attesting Officer

Acting Commissioner of Patents and Trademarks